United States Patent

[11] 3,568,010

[72] Inventor Joseph Maserjian
Sunland, Calif.
[21] Appl. No. 799,353
[22] Filed Feb. 14, 1969
[45] Patented Mar. 2, 1971
[73] Assignee the United States of America as represented by the Administrator of the National Aeronautics and Space Administration

[54] THIN FILM CAPACITIVE BOLOMETER AND TEMPERATURE SENSOR
27 Claims, 8 Drawing Figs.

[52] U.S. Cl. .......... 317/230, 317/231, 317/238, 250/83
[51] Int. Cl. .......... H01l 7/00
[50] Field of Search .......... 250/83; 317/230, 231, 232, 233, 234/8, 238

[56] References Cited
UNITED STATES PATENTS

| | | | |
|---|---|---|---|
| 2,720,573 | 10/1955 | Lundquist .......... | 317/238X |
| 3,321,711 | 5/1967 | Wolfe .......... | 317/234X |
| 3,359,466 | 12/1967 | Pollack et al. .......... | 317/234 |
| 3,440,499 | 4/1969 | Fasano et al. .......... | 317/234 |
| 3,456,112 | 7/1969 | Webb .......... | 250/83 |

*Primary Examiner*—James D. Kallam
*Attorneys*—John H. Warden and Monte F. Mott

ABSTRACT: An improved capacitive element which exhibits a useful change of capacitance with temperature is provided by increasing the effective space-charge barrier by evaporating thinner layers of an insulating metal oxide over both sides of a film of material capable of displaying dielectric properties disposed between two metal electrodes, or by employing a thicker film of anodized metal oxide which contains less ionic space charge than the corresponding film of material used in the first technique. Thermal and mechanical characteristics of devices of this type are optimized by providing a substrate of a metal first evaporated on a glass slide to form a thin foil. Once the foil has been bonded over holes on a supporting frame, the glass slide is removed, leaving a smooth surface to form the devices on. That surface may be anodized, and once the devices are formed over holes, the unanodized thickness of the foil may be etched off through the holes in the frame leaving devices supported by an anodized film of the foil material.

PATENTED MAR 2 1971 3,568,010

SHEET 1 OF 3

*INVENTOR.*
JOSEPH MASERJIAN

BY Lindenberg & Freilich

ATTORNEYS

INVENTOR.
JOSEPH MASERJIAN
BY Lindenberg & Freilich
ATTORNEYS

*INVENTOR.*
JOSEPH MASERJIAN

*BY* Lindenberg & Freilich

ATTORNEYS

THIN FILM CAPACITIVE BOLOMETER AND TEMPERATURE SENSOR

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to a thin-film capacitive device and more particularly to such a device which exhibits a useful change of capacitance with temperature.

In a copending application, Ser. No. 632,162, filed Apr. 18, 1967, now U.S. Pat. No. 3,456,112, there is disclosed a thin-film capacitive element which exhibits a useful change of capacitance with temperature. This change is a consequence of electronic conduction within a film capable of displaying dielectric properties disposed between two metal electrodes and in that respect differs fundamentally from normal capacitors.

In normal capacitors, the capacitance is determined by only dielectric properties and the thickness of the dielectric material between the metal electrodes. Any change in capacitance resulting from a change in temperature arises primarily from changes induced in the polarization of the ions (and their electron shells) comprising the dielectric material. These changes are very small in most dielectric materials but become very large in ferroelectric crystals near their Curie point. Indeed, ferroelectrics have been successfully used for thermal sensors, but because they require reasonably good crystalline structure, they are not practical for vapor deposited thin-film capacitors.

In contrast, the aforementioned copending application discloses a novel thin-film capacitor which exhibits a useful temperature dependence even though the vapor deposited film of material, such as, titanium dioxide is polycrystalline (essentially amorphous) in structure. The film contains a high level of ionized impurities typically at least a tenth of one percent. In the case of a device having the metal electrodes made of aluminum vapor deposited on the titanium dioxide film, a maximum of a few percent of ionized impurities (e.g., aluminum oxide or oxygen vacancies) can be disbursed from the electrodes into the titanium dioxide. Although, in theory at least, impurities can be diffused into the thin-film material using the techniques developed for the fabrication of active semiconductor devices, inherent disbursal of sufficient impurities during the process of vapor depositing metal electrodes has been found to be adequate while the deliberate diffusion of impurities may be difficult to control.

The disbursed impurities produce in the thin-film material space-charge barriers similar to the familiar Schottky-type barriers. The potential energies of the two space-charge barriers adjacent to the metal electrodes dip to a common minimum in the interior which approaches the Fermi level. This distortion of the potential energy (wherein the potential energies of interior regions of the thin-film material are close to the Fermi level and such regions are no more than several times as thick as regions adjacent the metal electrodes having potential energies substantially above the Fermi level) are due to the disbursed impurities and the large defect (or trap) densities present in such polycrystalline (essentially amorphous) films. These traps may either acquire additional electrons (as acceptors) and become negatively charged ions, or release an electron (as donors) and become positively charged ions. Thus when an excess of one type of charge prevails throughout the dielectric film, either due to disbursed impurities or the large defect densities, the space-charge barriers such as described are produced therein.

For very narrow space-charge barriers, quantum mechanical tunneling of electrons can occur between the interior of the dielectric film and the metal electrodes. This occurs at a narrow range of energies above the Fermi level and is a strong function of temperature. The tunneling distance corresponding to this energy is therefore temperature dependent. At sufficiently low frequencies, this distance determines the effective barrier thickness of a capacitance adjacent to each electrode. The interior of the film then behaves as a conductor and the equivalent circuit of the device comprises two temperature-sensitive capacitors connected in series by a resistor. This effect will prevail up to frequencies at which electrons can still move freely in the interior region in the presence of the traps.

For wider space-charge barriers (which require thicker films), or at higher frequencies of applied AC voltage, the electron conduction is primarily limited by the emission and capture rate of electrons at traps in the interior region of the film which is also strongly dependent on temperature. The potential variation within the film due to the ionic space-charge allows conduction to occur most easily near the minimum potential with progressively greater difficulty and requiring more thermal energy closer to the electrodes. The interior region of the film thus behaves as a conductor which widens to include a higher barrier potential with an increase of temperature. The effective width of the series-connected capacitive barriers decrease correspondingly with an increase in temperature.

Although this trapping effect provides a somewhat reduced dependence of the device capacitance on temperature than does the tunneling effect, the device still exhibits a useful change of capacitance with temperature. Thus, with the combined mechanisms for conduction of tunneling and trapping electrons, a temperature sensitive capacitance capacitive device may be provided by a suitable material displaying dielectric properties with impurities at least about one-tenth mole percent for establishing potential energy barriers in the material which are maximum next to opposing metal electrodes and a minimum near the Fermi level at interior regions therebetween for all thicknesses of the thin-film material from approximately 70 A to about 1,000 A. Below 70 A, leakage currents between the metal electrodes are produced by the applied AC voltage beyond an acceptable level. For film thicknesses greater than approximately 1,000 A the dependence of the device capacitance on temperature is reduced sufficiently to warrant considering the use of other temperature-sensitive devices for the particular application. Accordingly, the approximate limits of 70 A to 1,000 A are practical limits.

For a sensitive thermal detector, one would like a device which, on one hand, gives a fast thermal response to incident radiation and undergoes a maximum temperature rise without any sacrifice in sensitivity. In other words, a very sensitive thermometer may be useless as a thermal detector if it either has too large a thermal capacity or cannot be separated from its environment by a large thermal impedance. For this reason, temperature sensitivity is often sacrificed, in order to achieve more desirable thermal properties. It would be desirable to have a thermal detector based upon the thin-film capacitive device disclosed in the aforementioned copending application which exhibits a relatively strong dependence on temperature. In other words, it would be desirable to have a thin-film capacitive device of such structure as to permit optimizing the thermal properties while at the same time providing a more sensitive means of detecting temperature changes.

In the exemplary devices described in the aforesaid copending application, the devices had relatively narrow barriers, and although exhibiting a large capacitance temperature coefficient $\alpha$ defined by $$\alpha = (1/C)\,(dC/dT) \qquad (1)$$

because of the tunneling effect (which predominates in thinner films and which are more temperature dependent), the conduction losses were generally excessive at room temperature, thereby correspondingly lowering the $\alpha\,Q$ product, where $Q$ is a quality factor given by $$Q=2\pi foRC \quad (2)$$

$R$ and $C$ represent the equivalent parallel resistance and capacitance of the devices at the frequency $f_0$ of the AC voltage applied across its metal electrodes. Since $Q$ represents the approximate increase in signal-to-noise ratio of the devices over prior art devices displaying pure resistance which varies with temperature, it is desirable to increase $Q$, thereby decreasing resistive losses without significant losses in temperature variation of capacitance, i.e., without significantly decreasing $\alpha$.

SUMMARY OF THE INVENTION

The $Q$ of thin-film devices of the type disclosed in the aforesaid application may be improved in accordance with the present invention by incr-asing the effective space-charge barrier. The increase may be without limit until further increases would result in a sufficient decrease in $\alpha$ to offset the increase in $Q$. In so improving the product $\alpha$ $Q$, the voltage response $v_s$ to a temperature change $\Delta T$ is correspondingly improved since it has been found that voltage response is given by $$v_s=v_0\alpha Q\Delta T \quad (3)$$

where $v_0$ is the amplitude of the applied AC voltage. The increased barrier also increases the maximum allowable $v_0$ and increases $v_s$ correspondingly. It has also been found that this response is insensitive to properties of thin-film between the metal electrodes, except as to $\alpha$ $Q$ and $v_0$.

A first technique for increasing $Q$, and $v_0$ as well, developed as a further feature of the present invention, consists of evaporating thinner layers of an insulating metal oxide over both sides of a material capable of displaying dielectric properties and having impurities of at least about one-tenth mole percent for establishing potential energy barriers, as in the devices of the aforementioned copending application. The metal oxide is selected to have a wide band gap with a correspondingly large correspondingly energy, and ideally with sufficiently less ionic space-charge to increase the total effective barrier at each electrode. It is sufficient if the metal oxide results in an increase in average barrier height near the contacts over that obtained if the metal oxide were replaced by additional thickness of the film material with ionic space-charge throughout.

A second technique for increasing $Q$, and $v_0$ as well, developed as still a further feature of the present invention, consists of employing a thin metal-oxide film selected to provide an ionic space-charge resulting from the process by which it is provided such that the desired barriers are established between two sides where electrodes are deposited. The potential energy barriers change from a value substantially above the Fermi level at the electrodes to a value approaching the Fermi level in the film interior. The thickness of the metal-oxide film, preferably an anodized film of an electrode for the device, is selected to be thicker and contain less ionic space-charge than the corresponding film of material in the devices of the aforesaid copending application, thereby increasing the $Q$ and maximum $v_0$ of the devices, but with sufficient ionic charge to provide adequate values for the coefficient $\alpha$ for an improved $\alpha Q$ $v_0$ product.

In accordance with still another feature of the present invention, devices which exhibit a useful change of capacitance with temperature may be formed on a thin anodized metal-oxide film which serves as a supporting substrate. A preferred process for providing such thin metal-oxide supporting films comprises vapor depositing a suitable metal foil over a suitable release agent coated on the surface of a glass slide to a thickness substantially greater than the anodized film desired. Then a suitable frame is bonded to the vapor deposited metal foil using a suitable bonding material, and the glass slide is released from the foil which remains bonded to the frame. Alternatively, a metal foil may be bonded and electropolished to provide a smooth surface. The exposed smooth surface of the foil is anodized to the desired oxide thickness while the back side is masked to prevent anodization. After forming the devices over the oxide film, metal is removed from the back of the foil with a suitable etchant while protecting the devices, frame and outer surfaces with a thick coating of chemical resist. The result is a thin metal-oxide film supporting the devices on the frame. Since such a supporting film may be made very thin, greater freedom is provided in optimizing the thermal and mechanical characteristics of the devices.

A variant of this technique for providing a thin-film substrate is to bond a thin metal foil to a supporting frame as before, and then proceed to develop a device which exhibits a useful change of capacitance with temperature, using the metal foil as one of the device electrodes. In that manner, the metal foil functions as both a support and an electrode for the device. The surface of the foil may be anodized to provide one of the oxide layers for a device produced in accordance with the first technique described for increasing $Q$ and $v_0$ as well. Devices may also be produced on the foil in accordance with the second technique by depositing a thin film of metal-oxide (or metal later anodized) selected to provide a desired ionic space-charge upon being deposited (or anodized). Then a second electrode is deposited on the metal-oxide film to complete the device.

The novel v features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
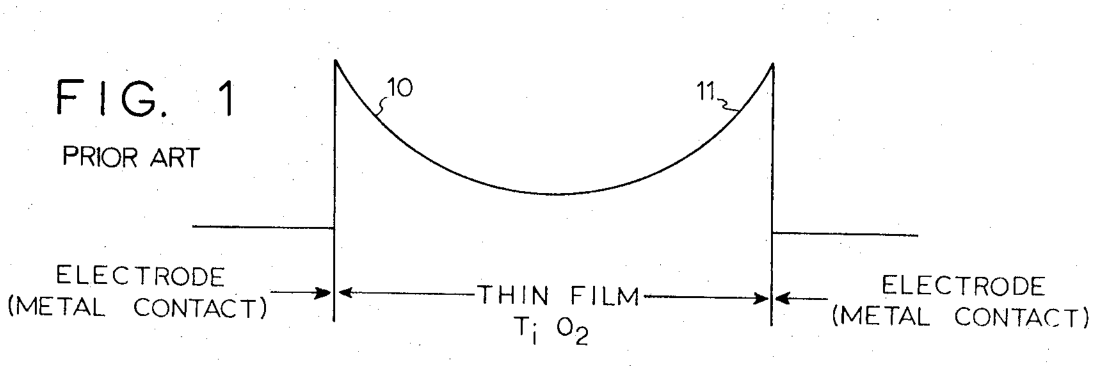
FIG. 1 PRIOR ART
FIG. 1 is an idealized energy-position diagram showing the potential energy at various positions along the thickness of exemplary devices disclosed in the aforesaid copending application.

Referring to the drawings, FIG. 1 shows in an idealized energy-position diagram the relatively narrow barriers 10 and 11 produced by a positive ionic space-charge in material such as $TiO_2$. A negative space-charge which may occur in some materials would produce a complementary diagram with barriers at the valance band for an exemplary device disclosed in the aforesaid application. Although exhibiting a large capacitance temperature coefficient $\alpha$ because of the predominant effect of electrons tunneling through the narrow barriers, the conduction losses of the device were generally excessive at room temperature, correspondingly lowering the $\alpha$ $Q$ product for the device. Small AC voltages $V_0$ were required by the thin film to avoid exceeding the breakdown potential of the narrow barriers.

The temperature change $\Delta T$ of the device due to absorbed power $P$ from incident radiation depends on the thermal impedance $Z_T$ between the device and its environment through the relation $$\Delta T = Z_T P \quad (4)$$

The thermal response time $\pi = Z_T C_T$, where $C_T$ is the thermal capacitance of the device. Since it is usually desirable to maximize $\Delta T$ and minimize $\pi$, it is desirable to maximize $Z_T$ and minimize $C_T$. Both may be simultaneously accomplished by minimizing the total composite thickness of the device when suspended in vacuum. For performance competitive with other types of devices, the thin-film should be less than 1,000 A thick and as thin as possible, except for applications where the thermal frequency is extremely high such that the response becomes independent of film thickness, such as more than $10^6$ Hz. for a thickness of 2,000 A.

To increase the response of the device $v_s$ to a temperature change $\Delta T$, when placed in an appropriate tuned circuit, the AC voltage applied $v_o$ should be increased. But to increase the thickness of the thin-film in order to be able to increase $v_o$ would decrease the thermal response unless some other change can be made to maintain the composite thickness effectively the same, as by decreasing the thickness of the supporting substrate.

Figure 2:
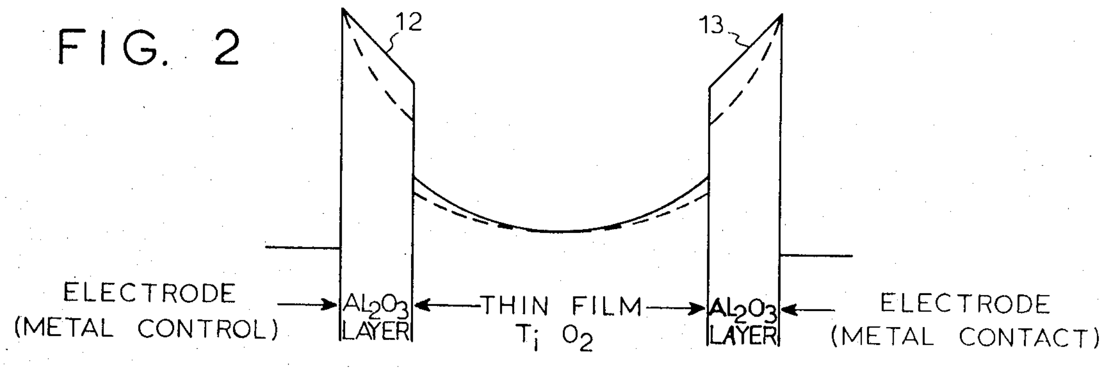
FIG. 2 is an idealized energy-position diagram corresponding to that of FIG. 1 for devices produced in accordance with the first technique of the present invention for increasing the quality factor $Q$ and the applied AC voltage $v_0$ as well.

To optimize thermal properties of the device, and at the same time provide a more temperature-sensitive device, it is possible to maintain the composite thickness effectively the same, while still providing for an increase in applied voltage $v_o$, and at the same time increase the $Q$ that is accomplished in accordance with the first technique of the present invention, which is to increase the effective barrier width by evaporating thin layers of a metal-oxide, such as A1$_2$O3, between the thin-film (for example $TiO_2$) and the electrodes, as schematically indicated in the diagram of FIG. 2 corresponding to the idealized energy-position diagram of FIG. 1, but for the new structure.

The evaporated $A1_2O_3$ layers are better electric insulators than the thin $TiO_2$ film and contain less ionic space-charge. Therefore, the $A1_2O_3$ layers increase the total effective barrier at each electrode as indicated by the barriers 12 and 13. The ionic space-charge distribution remains in the thin-film of $TiO_2$ as in the previous device. Several devices were evaluated from their values of $\alpha$ and $Q$ as a function of AC voltage and frequency applied (using an AC impedance bridge) at and slightly above room temperature. Typical values for the better devices were approximately $10^{-3}$ deg$^{-1}$ for $\alpha$ and greater than .05 deg$^{-1}$ for the product $\alpha$ $Q$ at 10 or 20 Hz. and 1 volt RMS. The product $\alpha Q$ in some devices was as high as 0.10 deg$^{-1}$. At slightly higher voltages, the product $\alpha$ $Q$ decreased with increasing voltages. Therefore, although greater voltages are made possible while the $Q$ of the devices is increased, the practical limit is about 1 volt RMS for the applied voltage $v_o$ for constantly high voltage response $v_s$. Thus, although the practical limit for the applied voltage is not substantially increased in these devices, the $\alpha$ $Q$ is increased due to an increase in $Q$, and therefore voltage response $v_s$ is increased. To that extent it does become possible to increase the voltage to levels above those deemed practical in the previous devices by sacrificing some increase in the product $\alpha$ $Q$. In other words, this technique makes it possible to increase applied voltage $v_o$ for a given voltage response $v_s$, or to increase the latter by not increasing the applied voltage. Different applications for the devices will dictate which increase should be employed.

In considering the essential device noise ratio possible with these new devices, where that ratio is defined as the total noise power from the device to the noise power due to the essential temperature noise, it is desirable to optimize the equivalent resistance $R$ of the device for the minimum amplifier noise by an appropriate choice of area and frequency. In some devices, a value of 100 Ω was achieved for a device area of $2 \times 10^{-3}$ cm.$^2$ and of applied voltage of 20 Hz., which is ideal for a commercially available low-noise amplifier.

Figure 3:
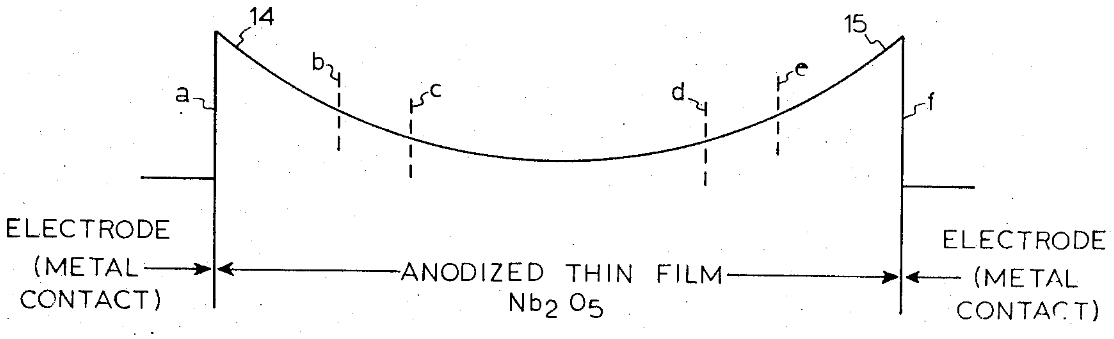
FIG. 3 is an idealized energy-position diagram corresponding to that of FIG. 1 for devices produced in accordance with the second technique of the present invention for increasing the quality factor $Q$ and the applied AC voltage $v_0$ as well.

In accordance with the second technique of the present invention, both the $\alpha$ $Q$ product and the practical limit of applied voltage $v_o$ may be increased simultaneously, thereby increasing the response $v_s$, by employing a metal-oxide film, preferably an anodized film, and increasing the thickness of the film, as schematically indicated in the diagram of FIG. 3 corresponding to the idealized energy-position diagram of FIG. 1, but for a thicker film. Although $TiO_2$ could again be selected for the material of the thin-film, and although experience indicates that barriers 14 and 15 can be readily formed by anodizing titanium, the $TiO_2$ films exhibit instabilities due to ionic drift. Consequently, other materials are preferred for the thin-films, such as $Al_2O_3$, $Ta_2O_5$, $ZrO_5$ and $Nb_2O_5$. These materials were found to be quite stable. Among these $Nb_2O_5$ provided that best capacitance temperature coefficient (greater than about $10^{-3}$ deg$^{-1}$) and is therefore preferred.

The selected metal (A1, Ta, Zr or Nb) is preferably provided as a high-purity evaporated film and then anodized to the desired thickness of the metal oxide. The process of vapor depositing the metal and anodizing it provides the necessary impurities for the desired space-charge distribution. The resulting anodized film may be less than stoichiometric, thereby providing oxygen vacancies which serve as ionized impurities. Alternately, traces of other impurities may be introduced in the process to produce the desired space-charge. It would theoretically be possible to purify the process to eliminate all traces of other impurities in order to rely solely upon oxygen vacancies for the space-charge, but the time and effort required would be greater than the time and effort required to achieve the desired results empirically with traces of impurities in the process. There may be other techniques by which a similar ionic space-charge distribution could be achieved in an anodized film, but the empirical method has proved to be quite satisfactory in terms of reproducibility. For example, impurities may be deliberately introduced, by adding known donors or acceptors to the film, but the problems of controlling the impurities are believed to be sufficiently significant to warrant reliance on the empirical technique. Excessive or uncontrolled contamination with impurities can seriously degrade any of the devices, resulting in large leakage and low breakdown voltage.

It should be noted that the idealized energy-position diagram of FIG. 3 for $Nb_2O_5$ is shown symmetrical, but in practice it need not be. An asymmetrical energy barrier results in an unequal division of the capacitance at each electrode; however, only the total of the effective barrier widths is important.

At sufficiently low frequencies, the tunneling effect determines the effective barrier widths $a - b$ and $e - f$. However, at higher frequencies the trapping effect becomes important and determines the effective barrier widths $a - c$ and $d - f$, which is also temperature dependent. As noted hereinbefore, the that temperature dependence is somewhat less than the temperature dependence of the barrier width determined by the tunneling effect, but the device still exhibits a useful change of capacitance with temperature, and has several advantages, namely a higher $Q$ and higher limit of applied AC voltage $v_o$. Both advantages combine to provide a greater response $v_s$ to a temperature change $\Delta T$, even though the coefficient $\alpha$ may be decreased because of an increase of the product $\alpha Q$ through the increase of $Q$, and the possible further increase of the total product $v_o$ $\alpha Q$ which defines response $v_s$ to a temperature change $\Delta T$ as noted hereinbefore by Eq. (3).

To summarize, before describing in greater detail the techniques for producing the devices schematically represented by the diagrams of FIGS. 2 and 3, the temperature-dependent capacitance is not significantly altered by increasing the effective charge barrier width. Such an increase may be achieved by layers of a good insulating metal-oxide with significantly less or no ionic space-charge. If there is some ionic space-charge, the diagram of FIG. 2 would follow the dotted lines for the barriers 12 and 13, but that would not alter the operation of the device appreciably. Since the barriers 12 and 13 are higher than for a thin film without such layers of metal-oxide, as shown by the diagram of FIG. 1, the practical limit of the applied voltage $v_o$ is increased while $Q$ is also increased. Thus, provision of such layers increases the effective barriers in the device represented by FIG. 1 without necessarily increasing the actual overall thickness. The increase of $Q$ is accompanied by a decrease in resistive losses and may result in an increase of the product $\alpha Q$.

The effective space-charge barrier width may be increased by using a metal-oxide film of increased thin thickness with a correspondingly smaller ionic charge density for the device material. That effectively increases the space-charge barriers 14 and 15 which increases $Q$ and allows the applied voltage $v_o$ to be increased, resulting in an improved response $v_s$. To offset the increase in actual thickness of the thin film the thickness of the supporting substrate may be decreased, such as by using an anodized film of a metal in accordance with another feature of the present invention.

Figure 4:
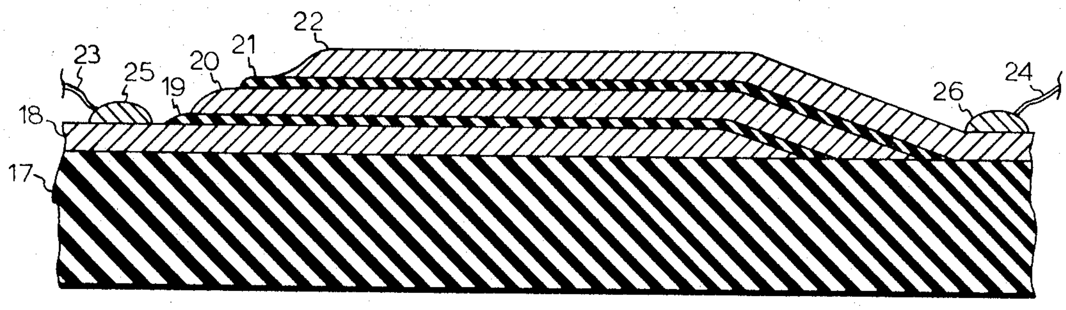
FIG. 4 is an enlarged sectional view of a device produced in accordance with the first technique of the present invention.

Referring now to FIG. 4 which illustrates an enlarged sectional view of a device produced in accordance with the first technique of the present invention, it should be understood that the dimensions are distorted to facilitate clarity of illustration. The device comprises a substrate 17, which may be a thin sheet of mica supported on a suitable frame. A first electrode 18 of aluminum is deposited on the substrate 17. An extremely thin film 19 of $Al_2O_3$ is deposited over over the end of the electrode 18 to provide a first of two layers of $Al_2O_3$. An optimum thickness for these layers a was found to lie in the range between 20 A and 50 A. A thin film 20 is then deposited over the layer 19 to a thickness between approximately 75 A and 200 A. It should be understood that these limits are not critical since all that is required between the first layer 19 and the next layer 21 of $Al_2O_3$ is a sufficient film of $TiO_2$ or similar material with ionic space-charge which warps the potential energy as illustrated in FIG. 2 resulting in barriers which change from a value substantially above the Fermi level at the interfaces with the layers 19 and 21 to a value approaching the Fermi level at interior regions of the film 20 so as to provide for a change in capacitance dependent primarily upon the change in the effective widths of the barriers in the film 20 with change in temperatures. If the film 20 is made too thin the barriers cannot be established therein. A practical upper limit for the thickness of film 20 is determined by the appearance of greater resistive losses and a net decrease in performance.

A second aluminum electrode 22 is vapor deposited over the layer 21. A temperature between 100° C. and 150° C. is preferred for the deposition of the electrodes 18 and 22. Both of the electrodes 18 and 22 are preferably deposited to a thickness of approximately 500 A each in the form of either oppositely extending strips, as illustrated in FIG. 4, or in orthogonal strips. The orthogonal arrangement is particularly suited for producing an array of devices. The overlapping area of the electrodes 18 and 22 define the capacitance area (typically $10^{-4}$ to $2 \times 10^{-3}$ cm²). External leads 23 and 24 are connected to the electrodes 18 and 22 at their extremities by globs 25 and 26 of solder, preferably an eutectic of indium and tin, after first evaporating silver over the ends of the electrodes 18 and 22. Further details of the evaporation techniques are given in the aforesaid copending application and a paper titled "Conduction Through $TiO_2$ Thin Films With Large Ionic Space-charge," published by J. Maserjian et al., in J. Phys. Cem. Solids, Vol. 28 (1967) at page 1971.

The second technique of the present invention for producing devices illustrated schematically by FIG. 3 will first be described in general terms for an $Nb_2O_5$ anodized thin film on any suitable substrate although it should be understood that other materials may be employed besides niobium. The first step is to evaporate a niobium strip (about 1,500 A thick and .5 mm. wide) by electron-bombardment of a high- niobium source (triple zone-refined). A common low-resistance connection to the niobium strip was provided by evaporating a thick film of aluminum (approximately 500 A thick) in a pattern which overlapped appropriate portions of the niobium strip. The niobium strip is then anodized in amonium tartrate solution (3 percent, pH 5.5) at constant voltage. Satisfactory results have been obtained by anodizing at 35 or 40 volts for 5 minutes. The anodized $Nb_2O_5$ films thus produced is approximately 15 A thick per volt applied. After thorough rinsing, the specimen is returned to the vacuum system where nickel electrodes are evaporated over the anodized film in the form of strips (approximately 750 A thick and .5 mm. wide) defining an array of capacitors with areas of $2.5 \times 10^{-3}$ cm² where the electrodes overlap.

Figure 5:
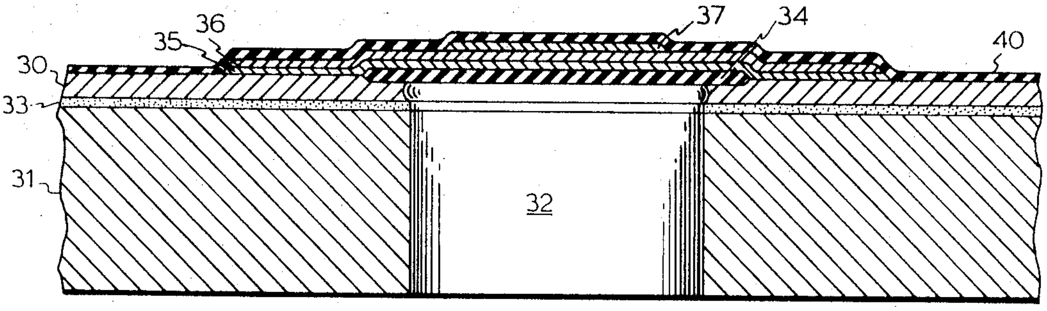
FIG. 5 is an enlarged sectional view of a device produced in accordance with with the second technique of the present invention.
Figure 6:
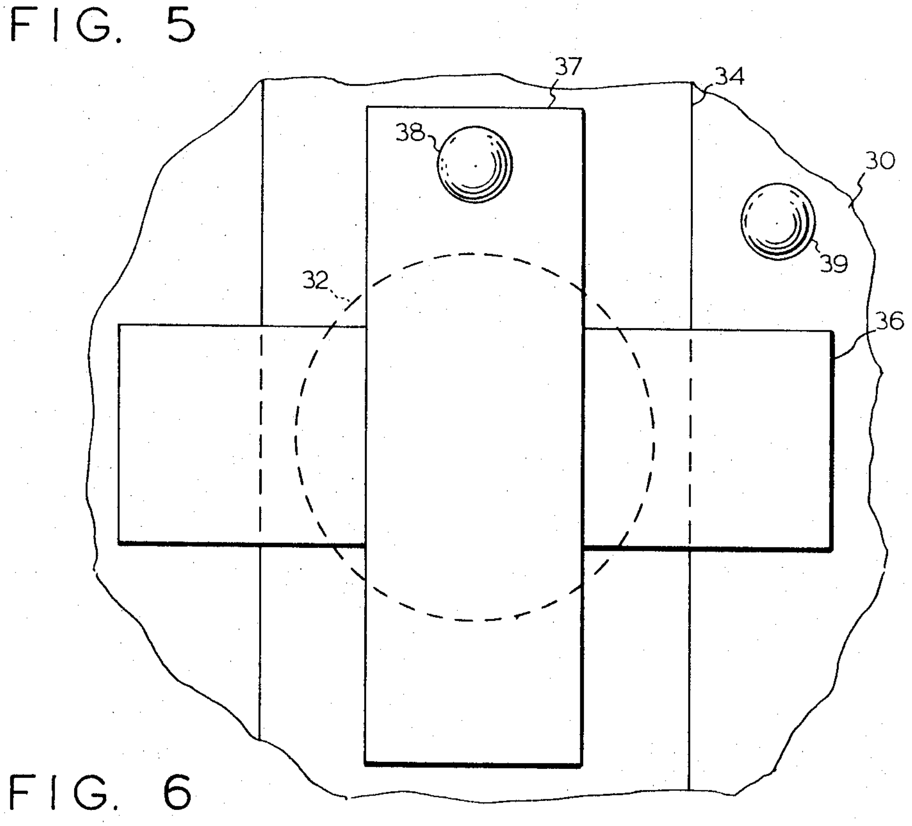
FIG. 6 is a plan view of a device of FIG. 5 produced as one of an array of similar devices.

Although anodized thin-film devices may be produced on any substrate in the general manner just described (many variations in the geometry are possible, each variant requiring a particular procedure which will be readily apparent to one skilled in the art), it is preferred that such anodized thin-film devices be produced with a very thin anodized aluminum substrate in order to minimize the composite thickness of the device since the thickness of the anodized thin-film is increased substantially over that of other devices described with reference to FIG. 4, or the devices disclosed in the aforesaid copending application. However, if mica is selected for the substrate, it is preferred that the mica films be formed by first bonding a precleaved surface of a mica sheet to a titanium frame having an array of holes, such as holes of 1/16-inch diameter. After curing the bonding material, such as resin, the mica sheet is pulled from the frame leaving behind a thin mica sheet (approximately 1,000 A) which covers the holes and remains bonded to the frame. With good procedure, this can result in a uniform film of proper thickness. A particularly good procedure is to precleave the mica to provide a surface free of steps to be bonded to the frame. This can be accomplished by carefully parting large mica sheets (5 to 8 mils thick) into two thinner sheets and cutting out good areas for use. However, notwithstanding care in this procedure, it is difficult to control the thickness of the substrate with consistancy. A greater disadvantage is the inability to provide a substrate substantially less than 1,000 A. Accordingly, the technique to be described with reference to FIGS. 5 and 6 is preferred for anodized thin-film devices.

The technique in general terms consists of first evaporating a film of about 2 microns of, for example, aluminum, on the surface of a glass slide that is coated with a release agent (methyl silane). A titanium frame is then bonded to the surface of the film with a thin layer of an epoxy resin. After curing the resin, the glass slide is released from the film evaporated thereon (aluminum foil) which remains intact with and permanently bonded to the frame. In that manner, a metal foil is provided over the holes of the frame with a very smooth surface on the side thereof opposite the frame. That smooth surface is anodized (in amonium tartrate solution for aluminum foil) at 80 volts for about 5 minutes, thereby forming the desired anodized film ($al_2O_3$) over the foil. The reverse side of the film exposed through the holes in the frame is masked by a suitable silicone gasket to prevent the reverse side from being anodized. After forming the anodized thin-film devices over the anodized film of the foil, the unanodized side of the foil is selectively removed where it is exposed by the holes in the frame (using aqua regia for an aluminum foil) while protecting the capacitors and the entire outer surface of the foil with a thick coating of a suitable chemical resist. With care in removing all traces of residue from the film, such as the chemical resist, which increases the thermal capacity, good results can be obtained. As before, connections to electrodes of the devices are readily made by evaporating silver over the ends of the electrodes in order to solder wire leads thereto with a eutectic of indium and tin.

An exemplary anodized thin-film device produced in accordance with the method just described to provide a very thin supporting substrate will now be described with reference to FIGS. 5 and 6. An aluminum foil 30 is bonded at 33 to a titanium frame 31 having a hole 32, which may be one of several holes provided in an array in the frame 31. The aluminum foil is electropolished to provide a smooth upper surface or preferably is provided with a smooth upper surface by the technique just described, namely, vapor depositing the aluminum foil on a glass slide using a release agent before the aluminum foil is bonded to the frame 31. A strip 34 of the aluminum foil is anodized to a desired thickness on the surface of the aluminum foil 30 before the anodized thin-film device is produced over the hole 32. That is accomplished by masking the surface of the aluminum foil so that only the area of the strip 34 is exposed to the anodizing solution (electrolyte). The inside of the hole 32 is sealed by a suitable removable silicone gasket, as noted hereinbefore, so that the underside of the aluminum is not anodized. After rinsing in pure water and drying the specimen, the specimen is placed in a vacuum evaporation system which is maintained at about $10^{-7}$ torr. While heating the specimen to 100° C., niobium is evaporated by electrode beam bombardment from a water cooled crucible through a precisely registered mask to produce a strip of niobium 35 extending from one side of the anodized aluminum strip 34 to the other in order to provide an ohmic contact with the aluminum foil 30 on each side of the strip 34. As noted hereinbefore, the niobium strip is deposited to a thickness of about 1,500 A which is several hundred angstroms thicker than the anodized $Nb_2O_5$ film desired for the device.

After removing the specimen from the vacuum evaporation chamber, the niobium strips are anodized in amonium tartrate solution as described hereinbefore, typically at 40 volts for about 3 minutes. This results in the anodized $Nb_2O_5$ film 36 over the entire surface of the niobium strip 35. As noted hereinbefore, the $Nb_2O_5$ film may not be stoichiometrically pure so that oxygen vacancies may occur in the film contributing to the ionic space-charge of the anodized film.

After rinsing and drying, the specimen is again placed in the vacuum evaporation chamber for depositing a nickel strip 37 over the anodized film 36 with the chamber vacuum at about $10^{-7}$ torr and the specimen at about 100° C., again using a mask in precise registration. The thickness of the nickel strip 37 is limited to a few hundred angstroms, a thickness which is sufficient to provide a good conducting film as one plate of the capacitor. Greater thickness would contribute to the overall thickness of the device which should be minimized. The active area of the device is defined by a square centered over the hole 32 where the strips 36 and 37 overlap. The strip 37 extends beyond the hole 32 sufficiently to permit a glob of solder 38 to be used to connect a wire lead thereto. A glob of solder 39 is placed directly on the aluminum foil 30 in a convenient location in order that an electrical connection be made to the niobium strip 35. A protective film 40, such as a film of $Al_2O_3$, shown only in FIG. 5 may be evaporated over the entire surface for protection. While evaporating that protective film 40, the spots on which the globs 38 and 39 of solder are to be placed are masked in order that when the globs are subsequently placed good electrical contacts can be made to the strip 37 and the aluminum foil 30. The protective film 40 of $Al_2O_3$ is evaporated by electron bombardment of saphire and deposited to a thickness of about 200 A.

After removing the sample from the vacuum deposition chamber, the aluminum foil 30 exposed by the holes 32 in the titanium frame 31 is removed to the boundary of the anodized aluminum film 34 by etching with aqua regia or other selective etchant. The opposite surface is protected with a chemical resist as aforementioned. The solution will not attack $Al_2O_3$ and is thus stopped by the anodized film 34. Thus, the desired anodized film device is left supported over the hole 32 by the anodized $Al_2O_3$ film 34.

Figure 7:
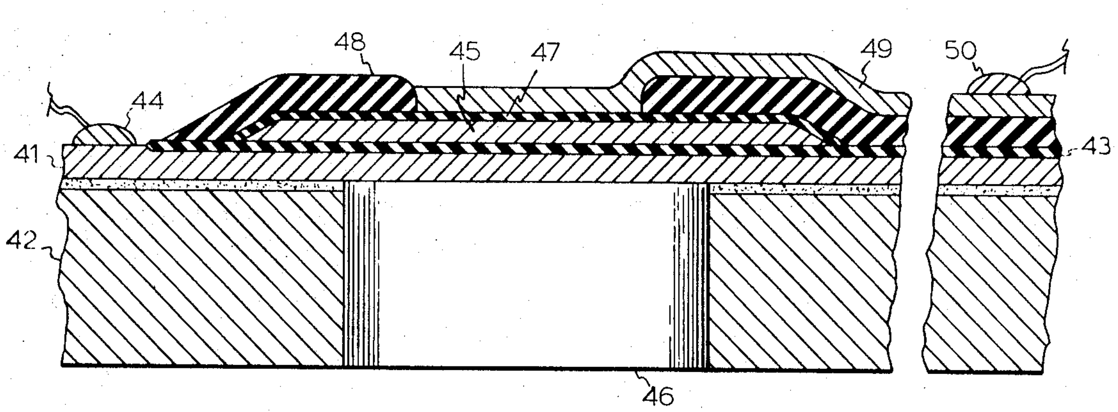
FIG. 7 is a variant of the device of FIG. 4.

A variant of FIG. 4 illustrated in FIG. 7 comprises an aluminum foil 41 of about 1,000 A prepared and bonded to a frame 42 as before. The device of FIG. 4 is then formed on the aluminum foil 41, using it as one electrode of the device. Thus a layer 43 of $Al_2O_3$ is then formed over the foil 41 by, for example, oxidation in an atmosphere of oxygen plasma, leaving an area unoxidized in order to make an electrical connection to the foil 41 with a glob 44 of solder. A film 45 of $TiO_2$ is then formed in the desired thickness in an area covering a hole 46 in the frame 42. Following that, a thin layer 47 of $Al_2O_3$ is deposited over the film 45. To complete the device, a thick layer 48 of $Al_2O_3$ is deposited except over an area where a connection is to be made with the glob 44 of solder, and an area over the hole 46. A second electrode 49 of aluminum, which defines the capacitance of the device, is deposited over the hole area and over the $Al_2O_3$ layer 48 out to one side to an area where another electrical connection can be made with a glob 50 of solder. The layer 48 of $Al_2O_3$ is deposited to a thickness of about 1,000 A or more in order that the capacitance of the device be defined by the opening in that thick layer over the hole 46. Although only one device is shown, obviously other devices may be formed in a row between the hole 46 and the connection made with the glob 50 of solder, and other rows may be similarly formed with common connections if a matrix of paralleled devices is desired.

Figure 8:
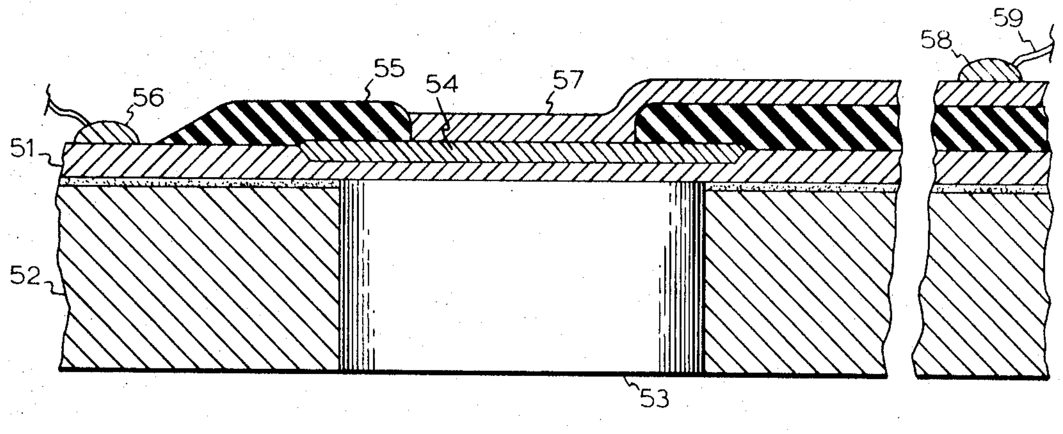
FIG. 8 is a variant of the device of FIG. 5.

Referring now to FIG. 8, a variant of FIG. 7 is shown which uses a foil 51 of, for example, niobium, prepared and bonded to a frame 52 in a manner similar to that described for an aluminum foil in FIGS. 5 and 7. An area over a hole 53 in the frame 52 is then anodized in a manner similar to the way the aluminum foil 30 was anodized in FIG. 5 to form a film 34 of $Al_2O_3$. The resulting anodized film 54 then corresponds to the dielectric film 36 of FIG. 5. A thick layer 55 of $Al_2O_3$ is deposited, except over the area where an electrical connection is to be made to the niobium foil 51 by a glob 56 of solder and an area over the hole 53 where a second electrode is to be deposited. The second electrode is formed by depositing a nickel film 57 in a manner corresponding to the way the film 49 is deposited in the device of FIG. 7. A glob 58 of solder then makes electrical connection of a lead 59 to the film 57. To facilitate that, the area where the connection is to be made is first coated with silver, as by vapor depositing a thin film to which the lead 59 can be readily soldered with a eutectic of indium and tin.

While particular embodiments of the invention have been described, many modifications and variations therein may be resorted to, particularly in the geometry of the devices, without departing from the teachings of the invention. Accordingly, it is not intended that the scope of the invention be determined by the disclosed exemplary embodiments, but rather should be determined by the breadth of the appended claims.

I claim:

1. A thin-film device which exhibits a change of capacitance with a change in temperature comprising:
a pair of metal electrodes;
a film of a material, having dielectric properties, disposed between said electrodes, said film including means for producing distributed ionic space-charges therein and establishing potential energy barriers within the film, the numerical value of said barriers varying from substantially above the Fermi level at the interface of said film with the electrodes to a value approaching said Fermi level at interior regions of the film away from said interface whereby a change in capacitance between said electrodes, upon a change in the temperature in said film, is proportional to the change in the effective width of said potential barriers; and
said film including means for controlling the effective value of said potential barriers.

2. A thin-film device as defined in claim 1 wherein said second stated means comprises thin layers of a metal oxide disposed on each side of said film between said film and said respective electrodes, said metal oxide having greater electrical insulating properties and less ionic space-charge than said film for increasing the total effective barriers adjacent to the electrodes therewith substantially over the effective barriers of said film exclusive of the metal oxide layers.

3. A thin-film device as defined in claim 2 wherein each of said layers is substantially thinner than said film.

4. A thin-film device as defined in claim 2 wherein said metal oxide on one side of said film is an oxide layer of one of said metal electrode.

5. A thin-film device as defined in claim 4 wherein said metal electrode on which said oxide layer is disposed is a metal foil supporting said device.

6. A thin-film device as defined in claim 5 wherein said metal foil is bonded to a supporting frame.

7. A thin-film device as defined in claim 1 wherein said second stated means comprises additional thicknesses of said material with ionic space-charge for correspondingly increasing the total effective barriers adjacent the respective electrodes.

8. A thin-film device as defined in claim 7 wherein said film material is an anodized metal-oxide film.

9. A thin-film device as defined in claim 8 wherein said anodized metal-oxide film is selected from a group consisting of $Al_2O_3$, $Ta_2O_5$, $ZrO_5$ and $Nb_2O_5$.

10. A thin-film device as defined in claim 8 wherein said anodized metal is $Nb_2O_5$.

11. A thin-film device as defined in claim 8 wherein said metal-oxide film is anodized on the surface of one of said metal electrodes.

12. A thin-film device as defined in claim 11 wherein said one of the metal electrodes is disposed on a supporting substrate comprising a metal foil bonded to a frame, an insulating film on the side of said foil opposite said frame, and said metal foil is removed in an area thereof exposing said insulating film.

13. A thin-film device as defined in claim 12 wherein said one of said metal electrodes is a metal foil supporting said device.

14. A thin-film device as defined in claim 13 wherein said metal foil is bonded to a supporting frame.

15. In a thin-film device having two parallel metal-oxide and a film of a material, having dielectric properties, disposed between said electrodes, said film including means for producing ionic space-charges therein and establishing potential energy barriers within the film, the numerical value of said barriers varying from substantially above the Fermi level at the interface of said film with the electrodes to a value approaching said Fermi level at interior regions of the film away from said interface whereby a change in capacitance between said electrodes, upon a change in temperature in said film, is proportional to the change in the effective width of said potential barriers, the improvement comprising; thin layers of an insulating metal-oxide on both sides of said material, said metal-oxide having a wide band gap, compared to the band gap of said material, with a correspondingly large barrier energy and an average barrier height near said electrodes greater than the average barrier height in additional thickness of said film material with ionic space-charges throughout, whereby the total effective barrier height of said device is greater than the barrier height in a homogeneous film of said material.

16. In a thin-film device having two parallel electrodes and a film of a material, having dielectric properties, disposed between said electrodes, said film including means for producing distributed ionic space-charges therein and establishing potential energy barriers within the film, the numerical value of said barriers varying from substantially above the Fermi level at the interface of said film with the electrodes to a value approaching said Fermi level at interior regions of the film away from said interface whereby a change in capacitance between said electrodes, upon a change in temperature in said film, is proportional to the change in the effective width of said potential barriers, the improvement comprising; an adjustment in the thickness of, said thin-film material between said electrodes for controlling the effective value of said potential barriers.

17. The improvement defined in claim 16 wherein said thin-film material is selected from a group consisting of $Al_2O_3$, $Ta_2O_5$, $ZrO_5$ and $Nb_2O_5$.

18. The improvement defined in claim 17 wherein said thin-film material is an anodized metal-oxide film.

19. The improvement defined in claim 16 wherein said thin-film material is $Nb_2O_5$.

20. The improvement defined in claim 16 wherein said thin-film is anodized on one of said electrodes.

21. In a thin-film device having two parallel electrodes and a film of a material, having dielectric properties, disposed between said electrodes, said film including means for producing distributed ionic space-charges therein and establishing potential energy barriers within the film, the numerical value of said barriers varying from substantially above the Fermi level at the interface of said film the electrodes to a value approaching said Fermi level at interior regions of the film away from said interface whereby a change in capacitance between said electrodes, upon a change in temperature in said film, is proportional to the change in the effective width of said potential barriers, the improvement comprising; a substrate beneath said device, said substrate including a metal foil member and a thin supporting insulating film formed on a side of said foil, one side of said formed film being joined to said device and the other side thereof having at least a substantial area free of said foil metal.

22. The improvement defined in claim 21 wherein said metal foil is bonded to a supporting frame.

23. The improvement defined in claim 22 wherein said insulating film comprises a metal-oxide.

24. The improvement defined in claim 23 wherein said metal-oxide film is anodized on said metal foil.

25. In a thin-film device having two parallel electrodes and a film of a material, having dielectric properties, disposed between said electrodes, said film including means for producing distributed ionic space-charges therein and establishing potential energy barriers within the film, the numerical value of said barriers varying from substantially above the Fermi level at the interface of said film with the electrodes to a value approaching said Fermi level at interior regions of the film away from said interface whereby a change in capacitance between said electrodes, upon a change in temperature in said film, is proportional to the change in the effective width of said potential barriers, the improvement comprising; one of said electrodes being a metal foil forming a substrate support for said device.

26. The improvement defined in claim 25 wherein said metal foil is bonded to a supporting frame.

27. The improvement defined in claim 26 wherein said metal foil is selected from a group consisting of Ti, A1, Ta and Nb, and wherein said metal foil is anodized to form a thin insulating film with an unanodized part of the foil serving as said one electrode.